May 28, 1968 J. P. WIKSWO 3,385,576
APPARATUS FOR DISPERSING A GAS IN A LIQUID
Filed May 2, 1967 2 Sheets-Sheet 1
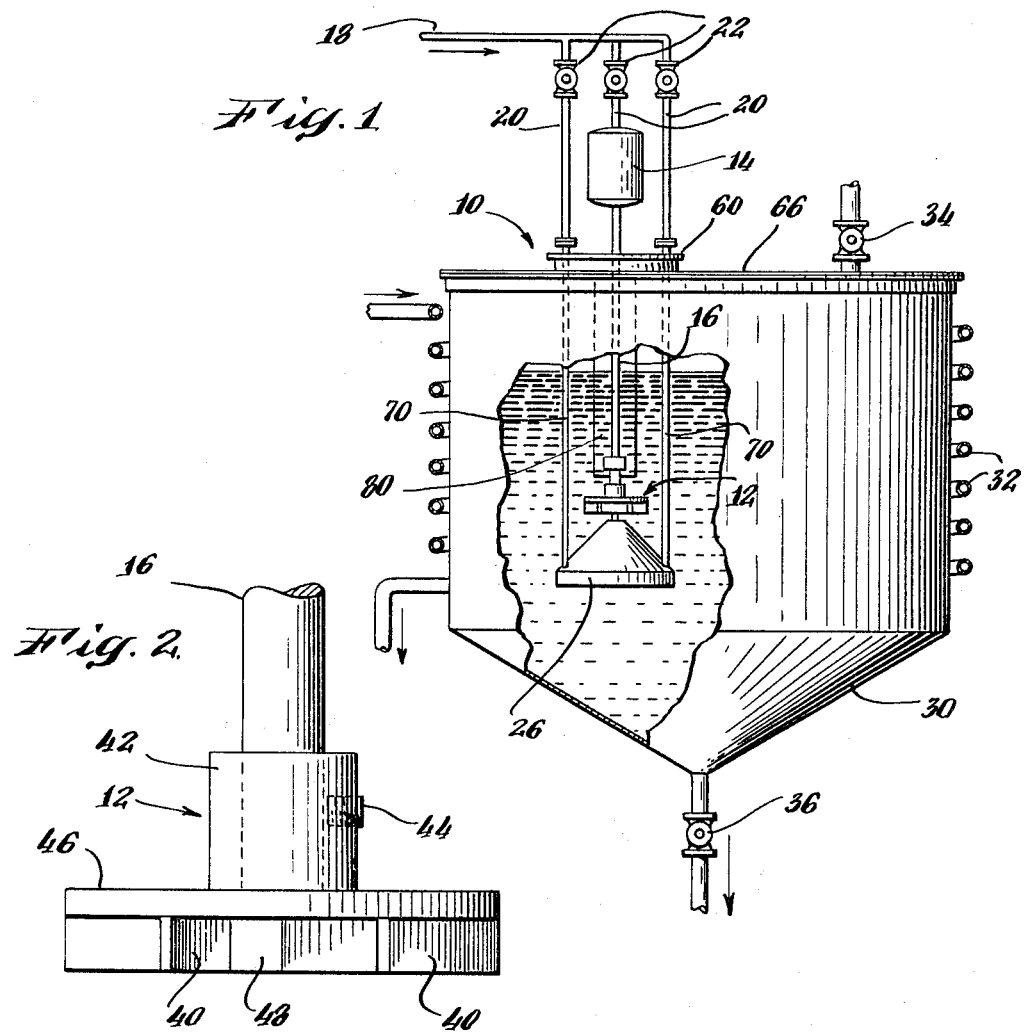
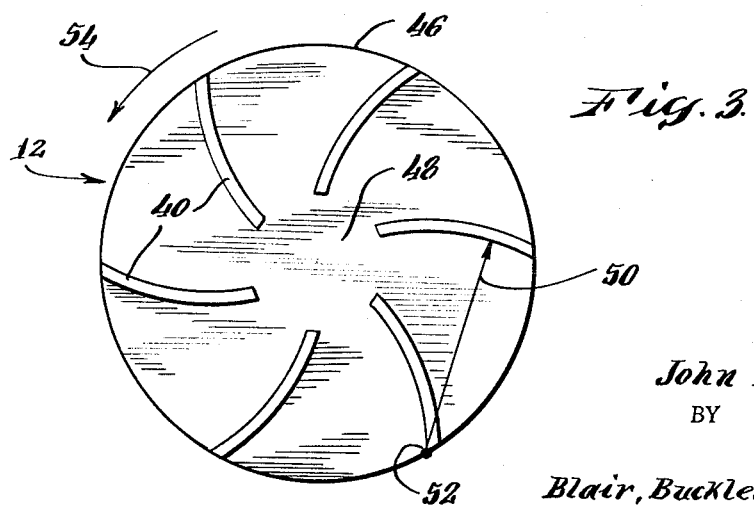
INVENTOR.
John Peter Wikswo
BY
Blair, Buckles, Cesari & St. Onge
ATTORNEYS.

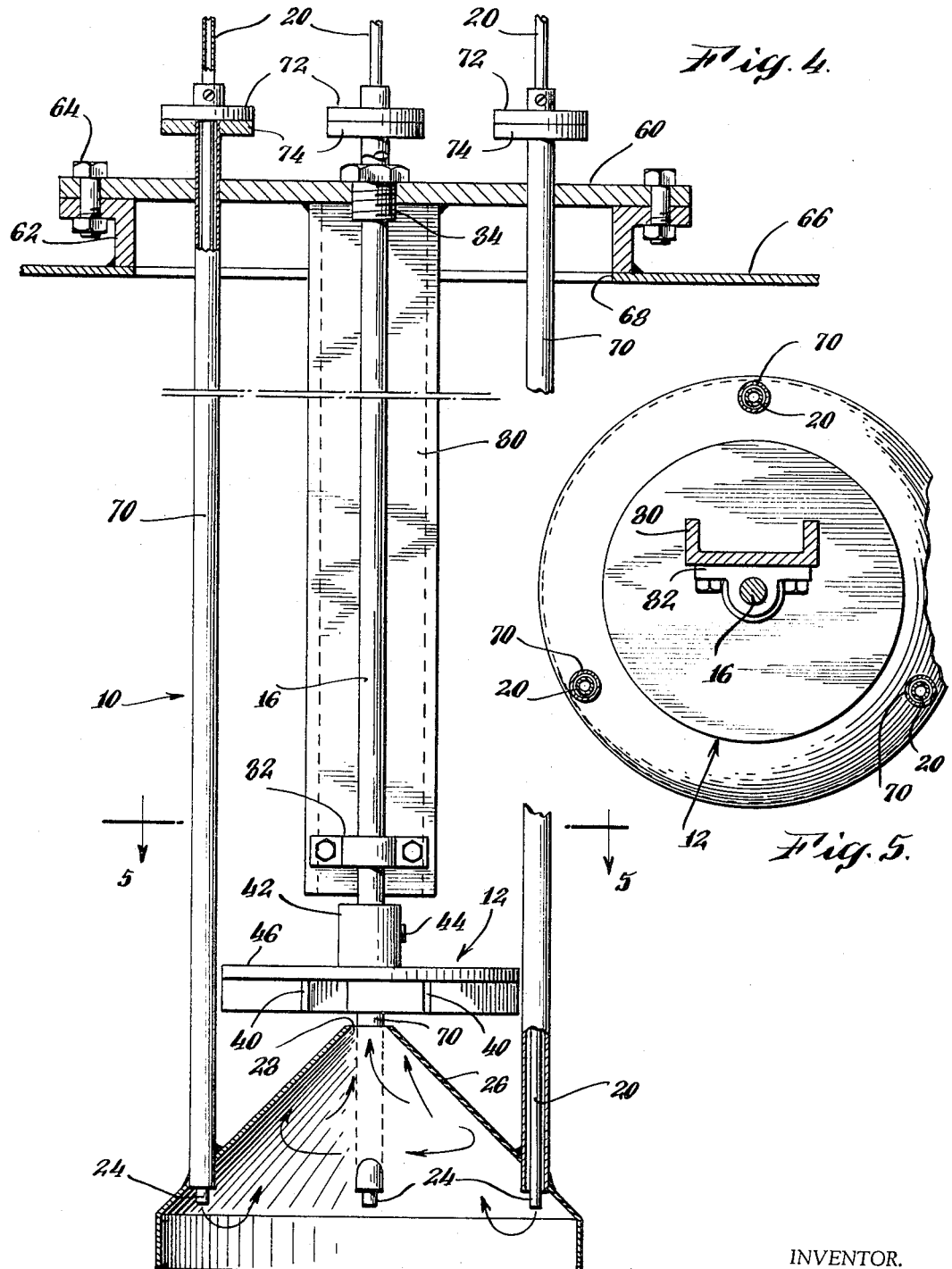

United States Patent Office 3,385,576
Patented May 28, 1968

3,385,576
APPARATUS FOR DISPERSING A GAS IN A LIQUID
John P. Wikswo, Amherst, Va., assignor to American Cyanamid Company, Stamford, Conn., a corporation of Maine
Filed May 2, 1967, Ser. No. 635,610
8 Claims. (Cl. 261—93)

ABSTRACT OF THE DISCLOSURE

The apparatus comprises a rotary impeller submerged in a liquid in which a gas is to be dispersed. The impeller has a horizontal top plate and a plurality of arcuate vanes extending along the underside of the top plate from adjacent its center to its periphery. Plural straight conduits, extending into the liquid, introduce the gas from downwardly facing exit ends to the interior of an inverted funnel having an upper, central opening spaced directly below the center of the impeller. The gas, directed by the funnel, rises into the center of the rotating impeller and is dispersed in the liquid in the form of finely divided bubbles.

*Reference to related application*

The apparatus described and claimed herein is an improvement over the apparatus described and claimed in the co-pending application of Earl W. Nelson entitled, "Apparatus for Dispersing a Gas in a Liquid," Ser. No. 635,613, filed May 2, 1967.

*Background and objects of the invention*

As set forth in the above noted co-pending application, it often becomes necessary to mix a gas with a liquid for the processing, purifying, etc., of such liquids. An example of this is in the purification of liquid titanium tetrachloride ($TiCl_4$), wherein hydrogen sulfide ($H_2S$) gas is dispersed in and mixed with crude $TiCl_4$ to precipitate out impurities such as vanadium. The titanium tetrachloride is then oxidized to titanium dioxide ($TiO_2$) used for paint pigments, paper sizing and the like.

The prior art approach to the dispersion and mixing of gases in a liquid has been generally to use porous plates, or the like, having a number of small gas exit orifices through which the gas is admitted to the liquid in the form of small bubbles. This was done for example, in the treatment of crude $TiCl_4$ to increase the surface area of the gas available for reaction. Unfortunately, the porous plates were readily plugged by precipitates and necessitated frequent cleaning. Because of their location and the typically small size of the gas exit orifices, the cleaning operation was time consuming and expensive. Further, to provide a reasonable reaction rate the porous plate necessarily had to be of an inordinately large size.

As disclosed in the above noted co-pending application, it was discovered that efficient gas dispersion is achieved and the drawbacks of the above-noted prior art apparatus substantially overcome through the use of a rotary impeller. The gas is introduced from above to the center of the impeller through a J-shaped tube having an upwardly facing gas exit spaced directly below the impeller center. The rotary impeller effectively dispersed the gas into the liquid in the form of finely divided gas bubbles.

While this gas dispersion apparatus using a rotary impeller constituted a definite improvement over prior art apparatus using a porous plate, there was still the tendency for the exit end of the J-shaped gas tube to become clogged with solid deposits, precipitates, etc. In the treatment of crude $TiCl_4$, this is thought to result from reactions within the exit end of the tube producing solid deposits therein. Also, since the vortex created by the impeller is directly above the upwardly facing tube exit end, solid precipitate in the liquid may settle into and become lodged therein. When this occurred, the gas conduit had to be removed for cleaning. While this was not a difficult task, the fact remained that the processing of the liquid had to be halted temporarily.

I have found that this problem of clogging in the apparatus of the above mentioned co-pending application can be efficiently overcome by substituting for the J-shaped gas tube at least one straight gas tube having a downwardly facing gas exit end opening into the interior of gas funneling means in the form of an inverted funnel. Preferably, a plurality of such straight gas tubes are employed. The funnel is supported with its smaller, upper open end spaced directly below the impeller center. The gas leaving the exit ends of the gas tubes is funneled upwardly along the converging inner surface of the funnel, exiting through the open upper end thereof to rise upwardly toward and into the impeller center. Rotation of the impeller breaks up these gas bubbles into finely divided gas bubbles for efficient dispersion and reaction with the liquid. By virtue of the straight line configuration of the gas tubes resulting in downwardly facing gas exit openings, clogging is substantially reduced.

Accordingly, an object of the invention is to provide improved apparatus for dispersing a gas in a liquid.

Another object is to provide apparatus of the above character wherein dispersion of the gas in the liquid is effected by a rotary impeller.

A further object is to provide apparatus of the above character which is economical to maintain; the tubes admitting the gas to the liquid for dispersion by a rotary impeller being not readily clogged and if clogged, easily cleaned.

A still further object is to provide apparatus of the above character which is inexpensive to manufacture, and efficient in operation and design.

Other objects of the invention will in part become obvious and will in part appear hereinafter.

The invention accordingly comprises the features of construction, combination of elements, and arrangement of parts which will be exemplified in the construction hereinafter set forth, and the scope of the invention will be indicated in the claims.

For a better understanding of the nature and objects of the invention, reference should be had to the following detailed description taken in connection with accompanying drawings, in which:

FIGURE 1 is a schematic side view, partially broken away, of a liquid treatment tank employing the gas dispersion apparatus of my invention;

FIGURE 2 is a side view of the impeller incorporated in the gas dispersion apparatus of FIGURE 1;

FIGURE 3 is a bottom view of the impeller shown in FIGURE 2;

FIGURE 4 is an enlarged side elevational view of the gas dispersion apparatus of FIGURE 1; and FIGURE 5 is a sectional view taken along line 5—5 of FIGURE 4.

Like parts have corresponding reference numerals throughout the several views of the drawings.

*Detailed description of the preferred embodiment*

Referring now to FIGURES 1 and 4, the gas dispersion apparatus of my invention, generally indicated at 10, comprises an impeller 12 drivingly connected to a motor 14 by a drive shaft 16. Gas supplied through a main conduit 18 is distributed among three vertically oriented tubes 20, as best seen in FIGURES 4 and 5. With valves 22 open, the gas is forced downwardly through tubes 20 for introduction to the submerged impeller 12. The downwardly facing exit ends 24 of tubes 20 (FIGURE 4), open into the interior of a gas funneling member 26. The gas leaving the exit ends 24 of tubes 20 is funneled by the converging interior surface of the funnel 26 to the smaller, upper open end 28 positioned immediately below the center of impeller 12. Rotation of the impeller 12 breaks up the relatively large gas bubbles emanating from the funnel 26 into finely divided gas bubbles for efficient dispersion into the liquid.

The whole apparatus 10, as seen in FIGURE 1, is supported on the tank 30, which in the case of titanium tetrachloride ($TiCl_4$) purification, is surrounded by heat exchange pipes 32. The tank 30 is provided with valved entry and exit connections 34 and 36, respectively, for the $TiCl_4$. The treatment of crude $TiCl_4$ with $H_2S$ gas is typically accomplished in a batching operation with tank 30 being filled with crude $TiCl_4$. The $H_2S$ gas is forced through tubes 20 and bubbles upwardly towards the center of impeller 12 as directed by the funnel 26. The impeller, rotated by motor 14, breaks up the $H_2S$ gas bubbles into very finely divided bubbles which are vigorously impelled and mixed into the surrounding $TiCl_4$. By virtue of these finely divided gas bubbles the surface area of the $H_2S$ gas available for reaction with the impurities in the crude $TiCl_4$ liquid is greatly increased and the purification process can be performed rapidly and efficiently. In addition the impeller acts as a liquid agitator.

Additional agitation means possibly driven off shaft 16 may be used, provided that the flow of gas bubbles into the impeller center is not disturbed.

With the funnel 26, the gas tubes 20, introduced from above the tank 30, may be straight, with their exit ends 24 facing downwardly; the funnel operating to direct the exiting gas to the impeller center. Thus if the exit ends 24 of tubes 20 become clogged with solid precipitates, deposits, etc., the straight tubes can be quickly cleaned in place or quickly removed for more thorough cleaning. There is, however, less tendency for the tubes 20 to become clogged, but in any event the processing of the crude $TiCl_4$ is unencumbered by long interruptions for cleaning of the apparatus which may be encountered in the above co-pending application due to the clogging of the single J-shaped gas feed tube.

It has been determined that efficient gas dispersion and mixing is achieved with an impeller 12 having plural vanes 40 (FIGURES 2 and 3) radiating outwardly from its center. The impeller includes a hub 42 fixed on the lower end of drive shaft 16 by any suitable means such as a set screw 44. A horizontal shroud or top plate 46, having a circular configuration, is affixed to the lower end of hub 42. The plurality of vanes 40 are affixed to the underside of the top plate 46 and extend outwardly from the open central portion 48 to the periphery of the top plate; this open central portion providing a greater access for liquid-gas flow into the impeller center.

As disclosed in the above noted co-pending application, for optimum performance the vanes 40 should be formed having an arcuate configuration with a radius of curvature, indicated at 50 in FIGURE 3, susbtantially equal to the radius of top plate 46. The location of the center indicated at 52 in FIGURE 3, of this radius of curvature 50 is preferably substantially at the point where the next adjacent vane 40 terminates at the periphery of top plate 36. The impeller 12 is preferably rotated at a peripheral speed of from 300 to 400 inches per second in a direction indicated by arrow 54 in FIGURE 3.

Referring now to FIGURE 4, the whole apparatus 10 is supported by a plate 60 removably attached to an annular flange 62, such as by bolts 64. The flange 62 is welded to a cover 66 for tank 30 about a hole 68 therein admitting the apparatus 10 into the interior of the tank. A plurality of tubular sheaths 70 projecting through and affixed in apertures formed in plate 60 extend downwardly to terminations below the impeller 12. The lower ends of sheaths 70 extend through apertures in the conical side wall of the funnel 26. The funnel is welded to and supported by the lower ends of sheaths 70.

The gas supply tubes 20 are inserted through the sheaths 70 such that their gas exit ends 24 extend beyond the sheath terminations. Flanges 72 fitted on gas tubes 20 abut flanges 74 affixed to the upper ends of sheaths 70 to determine the proper degree of insertion of the gas tubes therein. It is to be noted that when gas tubes 20 require cleaning, they may be readily removed without disturbing the remainder of the apparatus 10.

As shown in FIGURE 4, a vertical channel 80 is affixed at its upper end to plate 60, such as by welding, and extends downwardly into the interior of tank 30. A bearing 82 mounted to the lower portion of channel 80 supports and journals the lower end portion of drive shaft 16. Drive shaft 16 is introduced through a bearing and packing gland 84 fitted in plate 60.

In an actual working embodiment of a gas dispersion apparatus constructed in accordance with my invention, the impeller has a diameter of 8 inches, and each vane 40 is formed having a thickness of ⅛ inch, a height of 1 inch and a radius of curvature of 4 inches. The impeller is rotated at a rate of 850 revolutions per minute.

While the present invention has been described in connection with the dispersion of a gas in a liquid, it will be appreciated that this apparatus would also be applicable to the dispersion of a liquid in another liquid of greater density. One or more additional impellers driven from the same shaft may be provided; each impeller having its own gas supply means.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention which, as a matter of language, might be said to fall therebetween.

Having described my invention, what I claim as new and desire to secure by Letters Patent is:

1. Apparatus for dispersing a gas in a liquid comprising in combination:
    (A) an impeller immersed in the liquid, said impeller
        (1) being rotatably mounted, and
        (2) being formed having
            (a) an imperforate top plate, and
            (b) a plurality of vanes extending generally radially along the underside of said top plate from adjacent its center to the periphery thereof;
    (B) a motor rotatably driving said impeller; and
    (C) means supplying gas to said impeller, said gas supply means comprising
        (1) an inverted funnel having an exit opening positioned directly beneath the center of said impeller contiguous to said vanes, and
        (2) at least one gas supply tube having a gas exit opening into the interior of said funnel.

2. The apparatus defined in claim 1 wherein said gas supply tube extends through said funnels and has a straight configuration, said tube being oriented with its downwardly facing exit end remotely located relative to said exit opening of said funnel.

3. The apparatus defined in claim 2 wherein there are a plurality of gas supply tubes.

4. The apparatus defined in claim 1 wherein each of said vanes has an arcuate configuration.

5. The apparatus defined in claim 4 wherein each said vane is formed having a radius of curvature substantially equal to the radius of said impeller, the center of the radius of curvature for each said vane being located substantially at the point where each next adjacent vane in direction opposite to impeller rotation meets the periphery of said impeller top plate.

6. The apparatus defined in claim 1 wherein said motor drivingly rotates said impeller at a peripheral speed of from 300 to 400 inches per second.

7. The apparatus defined in claim 1 wherein there are a plurality of said gas supply tubes, said apparatus further comprising
(E) support means for said impeller and said gas supply means, said support means including
(1) a tubular sheath through which each said tube is inserted,
(2) said funnel being held in position by the lower end portions of said sheaths.

8. The apparatus defined in claim 1 wherein the liquid is titanium tetrachloride ($TiCl_4$) and the gas is hydrogen sulfide ($H_2S$).

References Cited

UNITED STATES PATENTS

| | | | |
|---|---|---|---|
| 1,526,596 | 2/1925 | Greenawalt | 261—93 |
| 2,154,150 | 4/1939 | Becze | 261—93 |
| 2,243,309 | 5/1941 | Daman et al. | 261—93 |
| 2,448,590 | 9/1948 | Gunther | 261—87 |
| 2,678,912 | 5/1954 | Kalinske et al. | 261—93 |
| 2,750,328 | 6/1956 | Stimpson et al. | 261—93 X |
| 2,801,083 | 7/1957 | Balassa | 261—93 X |

HARRY B. THORNTON, *Primary Examiner.*

TIM R. MILES, *Examiner.*